No. 821,604. PATENTED MAY 29, 1906.
G. W. BEGOLE.
TERRET FOR HARNESS.
APPLICATION FILED SEPT. 3, 1904. RENEWED NOV. 2, 1905.
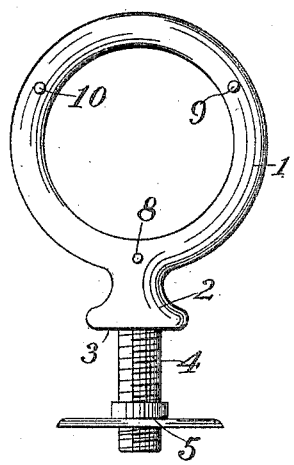
Fig.1.
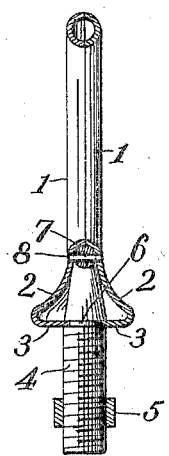
Fig.2.
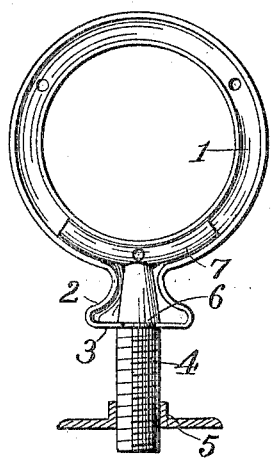
Fig.3.
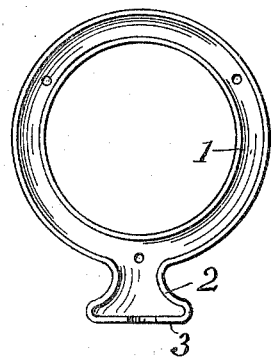
Fig.4.
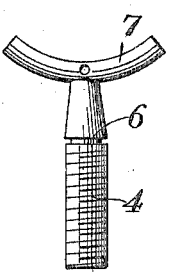
Fig.6.
Fig.5.
Witnesses
Edward R. Minoe.
Georgiana Chace
Inventor
Gordon W. Begole
By Luther V. Moulton
Attorney

UNITED STATES PATENT OFFICE.

GORDON W. BEGOLE, OF GRAND RAPIDS, MICHIGAN, ASSIGNOR TO GRAND RAPIDS SADDLERY HARDWARE MANUFACTURING COMPANY, LIMITED, OF GRAND RAPIDS, MICHIGAN, A CORPORATION OF MICHIGAN.

TERRET FOR HARNESS.

No. 821,604. Specification of Letters Patent. Patented May 29, 1906.

Application filed September 3, 1904. Renewed November 2, 1905. Serial No. 285,590.

*To all whom it may concern:*

Be it known that I, GORDON W. BEGOLE, a citizen of the United States, residing at Grand Rapids, in the county of Kent and State of Michigan, have invented certain new and useful Improvements in Terrets for Harness; and I do hereby declare the following to be a full, clear, and exact description of the invention, such as will enable others skilled in the art to which it appertains to make and use the same.

My invention relates to improvements in terrets for harnesses; and its objects are to provide an improved method of manufacture, to provide a light and strong device, to provide a device that may be manufactured in part of sheet metal stamped into shape by dies, and to provide the device with various new and useful features, hereinafter more fully described, and particularly pointed out in the claims, reference being had to the accompanying drawings, in which—

Figure 1 is a side elevation of the device embodying my invention; Fig. 2 a vertical section of the same; Fig. 3, a side elevation with one side of the ring removed and the nut in section; Figs. 4 and 5, details of the ring in plan view; and Fig. 6 a detail of the bolt or stud.

Like numerals refer to like parts in all of the figures.

The ring proper is made of two equal parts 1 1, divided in a vertical plane and forming, when assembled, a complete ring, secured together by suitable fastenings or rivets 8, 9, and 10. Projecting outward from one side of this ring is a suitable extension 2, having a broad base 3 to rest upon the top of the pad, and consisting of an inwardly-turned flange, adapted to surround the bolt 4 and engage a suitable circumferential groove 6 therein. This bolt has a screw-threaded outer end and is provided with a suitable flanged nut 5, and its inner end is provided with a segmental T-head 7, adapted to fit the hollow interior of the ring portions 1. When the parts are assembled and the ring portions properly secured to each other, the stud or bolt 4 is securely attached to the ring by means of this head 7, together with the surrounding flange 3, inserted in the groove 6. The hollow sheet-metal ring and lateral extension provide a substantial light and strong structure and are very rapidly made from sheet metal by means of suitable dies, and when the parts are assembled and properly secured the entire structure provides a light, substantial, and strong device well adapted for the purpose of serving as a terret-ring for a harness.

Having thus fully described my invention, what I claim, and desire to secure by Letters Patent, is—

1. A hollow terret-ring composed of two parts of stamped sheet metal provided with lateral extensions, a stud having a segmental T-head inserted in the ring said stud being surrounded and engaged by said extensions, and means for securing the parts of the ring to each other.

2. The combination of a ring composed of two hollow sheet-metal sections having lateral extensions and inwardly-turned flanges, and a screw-threaded stud having a segmental T-head inserted in the hollow ring and a groove engaged by the flanges.

3. The combination of a stud having a segmental T-head, a divided hollow ring inclosing the T-head, and also having a lateral extension and inwardly-turned flanges surrounding the stud, and means for securing the parts of the ring to each other.

4. The combination of a hollow ring consisting of two equal stamped sheet-metal portions, each portion having a lateral extension provided wth a base consisting of an inwardly-turned flange, a screw-threaded stud having a segmental T-head located within the ring and also having a circumferential groove engaged by the flanges, and rivets extending through the ring to secure the parts in place.

In testimony whereof I affix my signature in presence of two witnesses.

GORDON W. BEGOLE.

Witnesses:
LUTHER V. MOULTON,
PALMER A. JONES.